United States Patent Office 3,132,993
Patented May 12, 1964

3,132,993
TETRACYCLINE FORMULATIONS STABILIZED BY BISULFITES
Alphonse Peter Granatek, Syracuse, N.Y., assignor, by mesne assignments, to Bristol-Myers Company, New York, N.Y., a corporation of New York
No Drawing. Filed Mar. 30, 1955, Ser. No. 498,092
12 Claims. (Cl. 167—65)

This invention relates to new and useful formulations of the antibiotic tetracycline and its hydrates, salts and complexes and, more particularly, to tetracycline formulations stabilized by bisulfites.

Tetracycline is a relatively new, broad-spectrum antibiotic which has been described in J. Amer. Chem. Soc., 75, 4621–4623 (1953) and in Antibiotics Annual, pages 46–107 (1953–1954).

In many cases of oral medication, the physician, the patient or both prefer the use of oral medication. While tablets and capsules are often used for this purpose, it is frequently preferred that the medication be supplied as an aqueous suspension or solution. Such products, e.g. containing a typical dosage of 250 mgm./5 cc. of tetracycline hydrate, calcium tetracycline or tetracycline hydrochloride, have heretofore been available only in the form of dry mixtures requiring reconstitution with water before use. These so-called "dry-mixes" rapidly lose their original color; in addition such reconstitution and limited stability is obviously undesirable and introduces additional opportunities for errors, as of dilution, and contamination. The same objections apply to the use of "dry-mixes" for parenteral products. Thus, tetracycline and its salts in solution or suspension in hydroxylated solvents, e.g. water, propylene glycol, glycerine, Carbowaxes, polyethyleneglycol polymers, exhibit the highly undesirable property of changing their color from bright yellow to various brown and purple shades upon aging. If the suspensions or solutions are exposed to light this color transformation takes place fairly rapidly, i.e. 5 to 12 hours. The color transformation also takes place, but less rapidly, when the suspensions or solutions are shielded from light, taking about 14 to 30 days. This change of color in aqueous formulations must be overcome before tetracycline can be supplied to the medical profession as an aqueous solution or suspension.

It is the object of this invention to provide aqueous formulations, i.e. solutions or suspensions, of tetracycline or its salts, hydrates or complexes, which retain their original color for long periods of time.

The objects of the present invention have been attained and there is now provided according to the present invention an aqueous formulation of a tetracycline antibiotic color-stabilized by the presence of from 0.001 to 0.5 percent, and preferably from 0.01 to 0.20 percent, of a member selected from the group consisting of bisulfite ion and metabisulfite ion. These formulations are useful in the therapy of infectious disease.

By a tetracycline antibiotic is meant tetracycline in any of its forms, i.e. the amphoteric compound, hydrates, acid addition salts, alkali metal salts, alkaline earth metal salts, other metal salts, salt of ammonia or amines, chelates, double salts and complexes. The formulation referred to includes suspensions, solutions and gels. The stabilizing ion is supplied in the form of added salts, e.g. sodium bisulfite, sodium metabisulfite, sodium formaldehyde-bisulfite, acetone sodium bisulfite, calcium bisulfite solution, or in other customary ways, such as the addition of sulfur dioxide to a buffered solution. This stabilizing action is effective in formulations having a pH in the range of 3.5 to 8.5. The color-stabilizing action of the bisulfite or metabisulfite compounds of the present invention is effective for at least two years at room temperature.

Further information is supplied by the following examples which are provided for purposes of information only and are not to be construed as limiting the invention.

Example I

Micronized tetracycline base (i.e., the amphoteric form) (61.2 g.) and potassium alginate (Kelmar, 5.0 g.) were made up to 1396 cc. with water, mixed well, screened, mixed again and labelled vehicle "A." Vehicle "A" (139 cc.) and 0.2 g. 200-mesh sodium bisulfite were mixed and filled into bottles. The pH of this suspension was 5.3.

This formulation contained the equivalent of 250 mgms. tetracycline hydrochloride per 5 cc. as the tetracycline base and maintained its original color during six months storage at 37° C. A similar preparation containing no sodium bisulfite after one month's storage at 37° C. showed such a marked color change as to render it useless.

In another preparation vehicle "A" (139 cc.) and 0.5 g. 200-mesh sodium metabisulfite ($Na_2S_2O_5$) were mixed and filled into bottles. The pH of this suspension was 5.2.

This formulation contained the equivalent of 250 mgms. tetracycline hydrochloride per 5 cc. as the tetracycline base and maintained its original color during six months storage at 37° C. A similar preparation containing no sodium metabisulfite after one month's storage at 37° C. showed such a marked color change as to render it useless.

Example II

Sodium benzoate (3.6 g.), U.S.P. sodium citrate (7.2 g.), sodium saccharin (24.0 g.), sodium Sucaryl (60.0 g.) and granulated sugar (1,440 g.) q.s. to 3600 cc. with distilled water were brought to a boil and cooled to room temperature for use as a vehicle.

Two hundred-mesh sodium bisulfite (0.28 g.), micronized tetracycline base (20.66 g.), Hershey's Breakfast Cocoa (20.0 g.), coloring matter (0.016 g.), alginate (Kelmar, 0.33 g.) and Tween 40 (0.33 cc.) were made up to 200 cc. with the above vehicle to give a product having a light brown cocoa color and pH 5.08.

This formulation contained the equivalent of 100 mgms. tetracycline hydrochloride per cc. as the tetracycline base and maintained its original color during two months at 45° C. or at 37° C. A similar preparation containing no sodium bisulfite after one month's storage at 37° C. showed such a marked color change as to render it useless.

Example III

A vehicle was prepared by mixing 75.0 g. micronized calcium tetracycline, 2.4 g. flavoring and coloring matter and 1.2 g. sodium benzoate q.s. to 1200 cc. with a mixture of 75% simple syrup U.S.P. and 25% water (v./v.). To 300 cc. of this vehicle there was added 0.42 g. two-hundred mesh sodium bisulfite. After mixing 30 minutes, the product had pH 4.7 and a deep yellow color. This formulation maintained its original color during four months storage at 37° C. and one month's storage at 45° C. or 56° C. A similar preparation containing no sodium bisulfite after one month's storage at 37° C. showed such a marked color change as to render it useless.

Example IV

Sodium benzoate (3.6 g.), U.S.P. sodium citrate (7.2 g.), sodium saccharin (24.0 g.), sodium Sucaryl (60.0 g.) and granulated sugar (1,440 g.) q.s. to 3600 cc. with distilled water brought to a boil and cooled to room temperature for use as a vehicle.

Two hundred mesh sodium bisulfite (0.28 g.), micronized calcium tetracycline (25.0 g.), Hershey's Breakfast Cocoa (20.0 g.), coloring matter (0.016 g.), alginate (Kelmar, 0.3 g.) and Tween 40 (0.33 cc.) were made up to 200 cc. with the above vehicle to give a product having a light brown color and pH 6.2.

This formulation maintained its original color during four months storage at 37° C. and during two months storage at 45° C. or 56° C. A similar preparation containing no sodium bisulfite after one month's storage at 37° C. showed such a marked color change as to render it useless.

Example V

An aqueous suspension containing the equivalent of 250 mgm./5 cc. tetracycline hydrochloride was prepared using tetracycline hydrochloride and calcium chloride in a molar ratio of 1:1. Thus 0.5 kg. potassium alginate (Kelmar) was mixed into 15 l. distilled water at 58° C. After adding 40 kg. granular sugar and 14 l. distilled water, the mixture was heated to 64° C. and strained; the undissolved Kelmar thus removed was dissolved in 8 l. hot water and added to the solution. To this syrup at 56° C. there was added 1.153 kg. anhydrous calcium chloride dissolved in 16 l. water. After cooling to 22° C. there was added 5.0 kg. tetracycline hydrochloride. After mixing, the pH was adjusted to 1.53 with 70 cc. concentrated hydrochloric acid. Ten percent sodium hydroxide (5.2 l.) was then added, bringing the pH to 4.18. At this point, the calcium tetracycline formed in situ and precipitated.

There was then added in order to this suspension methyl Paraben (80 g.), propyl Paraben (20 g.), sodium bisulfite (140 g.), U.S.P. sodium citrate (200 g.), sodium saccharin (333 g.), flavoring (200 cc.), and sodium Sucaryl (1.67 kg.). The volume was adjusted to 100 liters by the addition of water. During additional mixing, the pH was found to be in the range 4.2 to 4.7. The suspension was milled through a 60 mesh screen and filled into bottles.

Example VI

An aqueous suspension containing the equivalent of 250 mgm./5 cc. tetracycline hydrochloride was prepared using tetracycline hydrochloride and calcium chloride in a molar ratio of 2:1. Thus to 0.5 kg. potassium alginate (Kelmar) dissolved in 25 l. distilled water at 60° C. there was added 40 kg. granulated sugar and water q.s. 58.3 l. To this syrup there was added at 38° C. a solution of 0.577 kg. anhydrous calcium chloride in 20.8 l. water. After cooling to 28° C., 5.0 kg. tetracycline hydrochloride was added; after mixing and cooling to 20° C. the pH was 1.75. The pH was adjusted to 3.58 by the addition of 4.0 l. 10% sodium hydroxide. At this point the calcium tetracycline formed in situ and precipitated. The following were then added in order: 80 g. methyl Paraben, 20 g. propyl Paraben, 140 g. sodium bisulfite, 200 g. U.S.P. sodium citrate, 333 g. sodium saccharin and 1.67 kg. sodium Sucaryl. After mixing, the pH was 4.3. The volume was adjusted to 100 l. by the addition of water. During additional mixing, flavoring (197 cc.) was added. The product, having pH 4.25, was filled into bottles.

Example VII

An aqueous suspension containing the equivalent of 250 mgm./5 cc. tetracycline hydrochloride was prepared using tetracycline hydrochloride and calcium chloride in a molar ratio of 1:1. Thus to 17 l. 85% simple syrup U.S.P.-15% distilled water (v./v.) in a mixer was added 333 g. potassium alginate which had been suspended overnight in 8 l. of 85% simple syrup U.S.P.-15% water (v./v.). The mixture was heated to 60° C. and made up to 58.3 l. by the addition of 85% simple syrup U.S.P.-15% water. To the resultant solution at 110° F. there was added a solution of 1.15 kg. anhydrous calcium chloride in 20 l. 85% simple syrup U.S.P.-15% water (v./v.). Tetracycline hydrochloride (5.0 kg.) was mixed into the syrup at 78° F., giving pH 1.7. The pH was adjusted to 1.5 by the addition of 50 cc. concentrated hydrochloric acid. The pH was then adjusted to 7.0 by the addition of 9.0 l. 10% sodium hydroxide. At this point the calcium tetracycline formed in situ and precipitated. The following were then added in order: 80 g. methyl Paraben, 20 g. propyl Paraben, 140 g. sodium bisulfite and 200 cc. flavoring material. After mixing the volume was increased to 100 l. by the addition of 85% simple syrup U.S.P.-15% distilled water (v./v.); the pH was 6.1-6.5. The pH was adjusted to 7.0 by the addition of 700 cc. 10% sodium hydroxide and the formulation was mixed and bottled.

Example VIII

An aqueous suspension containing the equivalent of 250 mgm./5 cc. tetracycline hydrochloride was prepared using tetracycline hydrochloride and calcium chloride in a molar ratio of 2:1. Thus to 17 l. 85% simple syrup U.S.P.-15% distilled water (v./v.) in a mixer was added 333 g. potassium alginate which had been suspended overnight in 8 l. of 85% simple syrup U.S.P.-15% water (v./v.). The mixture was heated to 60° C. and made up to 58.3 l. by the addition of 85% simple syrup U.S.P.-15% water (v./v.). To the resultant solution at 37° C. there was added a solution of 0.577 kg. anhydrous calcium chloride in 25 l. 85% simple syrup U.S.P.-15% water (v./v.). Tetracycline hydrochloride (5.0 kg.) was mixed into the syrup at 22° C., giving pH 1.6. The pH was then adjusted to 6.5 by the addition of 7.0 l. 10% sodium hydroxide. At this point the calcium tetracycline formed in situ and precipitated. The following were then added in order: 80 g. methyl Paraben, 20 g. propyl Paraben, 140 g. sodium bisulfite and 200 cc. flavoring material. After mixing the volume was increased to 100 l. by the addition of 85% simple syrup U.S.P.-15% distilled water (v./v.); the pH was 5.3. The pH was adjusted to 7.1 by the addition of 900 cc. 10% sodium hydroxide and the formulation was mixed and bottled.

Example IX

An aqueous suspension containing the equivalent of 250 mgm./5 cc. tetracycline hydrochloride was prepared using tetracycline hydrochloride and calcium chloride in a molar ratio of 4:1. Thus to 17 l. 85% simple syrup U.S.P.-15% distilled water (v./v.) in a mixer was added 333 g. potassium alginate which had been suspended overnight in 8 l. of 85% simple syrup U.S.P.-15% water (v./v.). The mixture was heated to 60° C. and made up to 58.3 l. by the addition of 85% simple syrup U.S.P.-15% water (v./v.). To the resultant solution at 56° C. there was added a solution of 288 g. anhydrous calcium chloride in 25 l. 85% simple syrup U.S.P.-15% water (v./v.). Tetracycline hydrochloride (5.0 kg.) was mixed into the syrup at 56° C., giving pH 1.8. The pH was then adjusted to 7.4 by the addition of 6.8 l. 10% sodium hydroxide. At this point the calcium tetracycline formed in situ and precipitated. The following were then added in order: 80 g. methyl Paraben, 20 g. propyl Paraben, 140 g. sodium bisulfite and 200 cc. flavoring material. After mixing the volume was increased to 100 l. by the addition of 85% simple syrup U.S.P.-15% distilled water (v./v.); the pH was 7.0-7.3. The formulation was mixed and bottled at pH 73.

Example X

Aqueous formulations of calcium tetracycline rendered color-stable by the presence of bisulfite ion were prepared by mixing the following ingredients in descending order as tabulated.

| Ingredient, amount | Formulation number | | | | | | | |
|---|---|---|---|---|---|---|---|---|
| | 1 | 2 | 3 | 4 | 5 | 6 | 7 | 8 |
| Sodium benzoate (200 mesh), g | 0.6 | 0.6 | 0.6 | 0.6 | 0.6 | 0.6 | | |
| Micronized calcium tetracycline, g | 38 | 38 | 38 | 38 | 38 | 38 | 38 | 38 |
| Flavoring material, cc | 0.66 | 0.9 | 0.9 | 0.9 | 1.2 | 1.2 | 0.9 | 0.9 |
| Sodium bisulfite, g | 0.84 | 0.84 | 0.84 | 0.84 | 0.84 | 0.84 | 0.84 | 0.84 |
| Sodium citrate, U.S.P., g | | | 1.2 | 1.2 | 1.2 | | | 1.2 |
| Soluble saccharin, g | | | 2.0 | 2.0 | 2.0 | | | 2.0 |
| Powdered sugar, g | | | 240 | 240 | 240 | | | 240 |
| Potassium alginate (Kelmar), g | 0.5 | | 3.0 | | | 1.0 | 1.5 | |
| Carboxymethyl-cellulose (HV Type 70), g | | 1.5 | | 6.0 | 6.0 | 1.0 | | 6.0 |
| Sodium Sucaryl, g | | | 10 | 10 | 10 | | | 10 |
| Distilled water, q.s. to, cc | | | 600 | 600 | 600 | | | 600 |
| Parabens, g | | | | | | | 0.60 | 0.60 |
| 85% simple syrup, U.S.P.-15% distilled water (v./v.), q.s. to, cc | 600 | 600 | | | | 600 | 600 | |
| Original pH | 4.3 | 4.4 | 4.75 | 4.75 | 4.8 | 4.4 | 4.2 | 4.8 |
| Added 10% sodium hydroxide, cc | 15.8 | 15.9 | 15.5 | 15.2 | 14.7 | 15.9 | 15.9 | 14.9 |
| Final pH after screening | 7.0 | 7.0 | 7.0 | 7.0 | 7.0 | 7.0 | 7.0 | 7.0 |

These formulations contained the equivalent of 250 mgm. tetracycline hydrochloride per 5 cc. as calcium tetracycline.

Example XI

Aqueous formulations of calcium tetracycline rendered color-stable by the presence of a bisulfite are prepared by mixing the following ingredients in descending order as tabulated.

| Ingredient, amount | Formulation number | | |
|---|---|---|---|
| | 1 | 2 | 3 |
| Sodium benzoate (200 mesh), g | 0.6 | | 0.6 |
| Micronized calcium tetracycline, g | 38.0 | 38.0 | 38.0 |
| Sodium bisulfite, g | 0.84 | 0.84 | 0.84 |
| Sodium citrate, U.S.P., g | 1.2 | | |
| Sodium saccharin, g | 2.0 | | |
| Micropulverized sugar, g | 240 | | |
| Potassium alginate (Kelmar), g | | 3.0 | |
| Carboxymethylcellulose (HV Type 70), g | 6.0 | | |
| 85% simple syrup U.S.P.-15% water (v./v.), q.s. to, cc | | 600 | |
| Flavoring material, cc | 1.2 | 1.2 | 1.2 |
| Sodium Sucaryl, g | 10.0 | | |
| Distilled water, q.s. to, cc | 600 | | |
| Parabens, g | | 0.60 | |
| Tween 40, cc | 0.28 | 0.28 | |
| Corn syrup 1500 gms. plus 700 cc. water, q.s. to, cc | | | 600 |
| Original pH | 4.9 | 4.3 | 4.2 |
| Added 10% sodium hydroxide, cc | 14.5 | 15.0 | 17.0 |
| Final pH after screening | 7.0 | 7.0 | 7.0 |

These formulations contain the equivalent of 100 mgm. tetracycline hydrochloride per cc. as calcium tetracycline.

Example XII

Aqueous formulations of calcium tetracycline rendered color-stable by the presence of a bisulfite are prepared by mixing the following ingredients in descending order as tabulated.

| Ingredient, amount | Formulation number | | |
|---|---|---|---|
| | 1 | 2 | 3 |
| Sodium benzoate (200 mesh), g | 0.6 | | 0.6 |
| Micronized calcium tetracycline, g | 38.0 | 38.0 | 38.0 |
| Sodium metabisulfite, g | 0.84 | 0.84 | 0.84 |
| Sodium citrate, U.S.P., g | 1.2 | | |
| Sodium saccharin, g | 2.0 | | |
| Micropulverized sugar, g | 240 | | |
| Potassium alginate (Kelmar), g | | 3.0 | |
| Carboxymethylcellulose (HV Type 70), g | 6.0 | | |
| 85% simple syrup U.S.P.-15% water (v./v.), q.s. to, cc | | 600 | |
| Flavoring material, cc | 1.2 | 1.2 | 1.2 |
| Sodium Sucaryl, g | 10.0 | | |
| Distilled water, q.s. to, cc | 600 | | |
| Parabens, g | | 0.60 | |
| Tween 40, cc | 0.28 | 0.28 | |
| Corn syrup 1500 gms. plus 700 cc. water, q.s. to, cc | | | 600 |

Portions of each formulation are adjusted by the addition of 10% sodium hydroxide to pH values of 6.5, 7.0, and 8.5. These formulations contain the equivalent of 100 mgm. tetracycline hydrochloride per cc. as calcium tetracycline. Equally useful, color-stable formulations are prepared using one-tenth, one-half, double and ten-fold amounts of the source of bisulfite ions used in the above example.

Example XIII

Aqueous formulations of calcium tetracycline rendered color-stable by the presence of a bisulfite are prepared by mixing the following ingredients in descending order as tabulated.

| Ingredient, amount | Formulation number | | |
|---|---|---|---|
| | 1 | 2 | 3 |
| Sodium benzoate (200 mesh), g | 0.6 | | 0.6 |
| Micronized calcium tetracycline, g | 38.0 | 38.0 | 38.0 |
| Formaldehyde sodium bisulfite, g | 0.84 | 0.84 | 0.84 |
| Sodium citrate, U.S.P., g | 1.2 | | |
| Sodium saccharin, g | 2.0 | | |
| Micropulverized sugar, g | 240 | | |
| Potassium alginate (Kelmar), g | | 3.0 | |
| Carboxymethylcellulose (HV Type 70), g | 6.0 | | |
| 85% simple syrup U.S.P.-15% water (v./v.), q.s. to, cc | | 600 | |
| Flavoring material, cc | 1.2 | 1.2 | 1.2 |
| Sodium Sucaryl, g | 10.0 | | |
| Distilled water, q.s. to, cc | 600 | | |
| Parabens, g | | 0.60 | |
| Tween 40, cc | 0.28 | 0.28 | |
| Corn syrup 1500 gms. plus 700 cc. water, q.s. to, cc | | | 600 |

Portions of each formulation are adjusted by the addition of 10% sodium hydroxide to pH values of 6.5, 7.0, and 8.5. These formulations contain the equivalent of 100 mgm. tetracycline hydrochloride per cc. as calcium tetracycline. Equally useful, color-table formulations are prepared using one-tenth, one-half, double and ten-fold amounts of the source of bisulfite ions used in the above example.

Example XIV

Aqueous formulations of calcium tetracycline rendered color-stable by the presence of a bisulfite are prepared by mixing the following ingredients in descending order as tabulated.

| Ingredient, amount | Formulation number | | |
|---|---|---|---|
| | 1 | 2 | 3 |
| Sodium benzoate (200 mesh), g | 0.6 | | 0.6 |
| Micronized calcium tetracycline, g | 38.0 | 38.0 | 38.0 |
| Acetone sodium bisulfite, g | 0.84 | 0.84 | 0.84 |
| Sodium citrate, U.S.P., g | 1.2 | | |
| Sodium saccharin, g | 2.0 | | |
| Micropulverized sugar, g | 240 | | |
| Potassium alginate (Kelmar), g | | 3.0 | |
| Carboxymethylcellulose (HV Type 70), g | 6.0 | | |
| 85% simple syrup U.S.P.-15% water (v./v.), q.s. to, cc | | 600 | |
| Flavoring material, cc | 1.2 | 1.2 | 1.2 |
| Sodium Sucaryl, g | 10.0 | | |
| Distilled water, q.s. to, cc | 600 | | |
| Parabens, g | | 0.60 | |
| Tween 40, cc | 0.28 | 0.28 | |
| Corn syrup 1500 gms. plus 700 cc. water, q.s. to, cc | | | 600 |

Proportions of each formulation are adjusted by the addition of 10% sodium hydroxide to pH values of 6.5, 7.0, and 8.5. These formulations contain the equivalent of 100 mg. tetracycline hydrochloride per cc. as calcium tetracycline. Equally useful, color-stable formulations are prepared using one-tenth, one-half, double, and ten-fold amounts of the source of bisulfite ions used in the above examples.

Example XV

Three portions of the formulations of Examples I through XI are also prepared with the addition during final mixing of sufficient 10% sodium hydroxide to adjust the pH to 6.5, 7.0, and 8.5 respectively.

Example XVI

Four portions of each of the formulations of Examples I through XI and XV are prepared using one-tenth, one-half, double, and ten-fold amounts of the source of bisulfite ions used in these examples.

Example XVII

Equally useful, color-stable formulations of tetracycline base or salts in hydroxylated solvents other than water are prepared using propylene glycol or glycerine or Carbowaxes or polyethyleneglycol polymers or mixtures thereof and also from 0.001 to 0.5 percent, and preferably from 0.01 to 0.20 percent, of a member selected from the group consisting of bisulfite ion and meta-bisulfite ion, as above. These are particularly adapted for aural use. In these cases also, use may be made of suspending agents, preservatives, buffering agents and the like if desired but this is not essential.

I claim:

1. An aqueous suspension suitable only for oral administration of a tetracycline antibiotic selected from the group consisting of amphoteric tetracycline, tetracycline hydrochloride and alkaline earth metal salts of tetracycline color-stabilized by the presence of from 0.001 to 0.5 percent by weight of said formula of a member selected from the group consisting of alkali metal bisulfites, alkaline earth metal bisulfites, formaldehyde sodium bisulfite, acetone sodium bisulfite, alkali metal meta-bisulfites and alkaline earth metal meta-bisulfites.

2. An aqueous suspension suitable only for oral administration of a tetracycline antibiotic selected from the group consisting of amphoteric tetracycline, tetracycline hydrochloride and alkaline earth metal salts of tetracycline color-stabilized by the presence of from 0.001 to 0.5 percent by weight of said formula of an alkali metal bisulfite.

3. An aqueous suspension suitable only for oral administration of a tetracycline antibiotic selected from the group consisting of amphoteric tetracycline, tetracycline hydrochloride and alkaline earth metal salts of tetracycline color-stabilized by the presence of from 0.001 to 0.5 percent by weight of said formula of an alkaline earth metal bisulfite.

4. An aqueous suspension suitable only for oral administration of a tetracycline antibiotic selected from the group consisting of amphoteric tetracycline, tetracycline hydrochloride and alkaline earth metal salts of tetracycline color-stabilized by the presence of from 0.001 to 0.5 percent by weight of said formula of sodium bisulfite.

5. An aqueous suspension suitable only for oral administration of a tetracycline antibiotic selected from the group consisting of amphoteric tetracycline, tetracycline hydrochloride and alkaline earth metal salts of tetracycline color-stabilized by the presence of from 0.001 to 0.5 percent by weight of said formula of calcium bisulfite.

6. An aqueous suspension suitable only for oral administration of a tetracycline antibiotic selected from the group consisting of amphoteric tetracycline, tetracycline hydrochloride and alkaline earth metal salts of tetracycline color-stabilized by the presence of from 0.001 to 0.5 percent by weight of said formula of formaldehyde sodium bisulfite.

7. An aqueous suspension suitable only for oral administration of a tetracycline antibiotic selected from the group consisting of amphoteric tetracycline, tetracycline hydrochloride and alkaline earth metal salts of tetracycline color-stabilized by the presence of from 0.001 to 0.5 percent by weight of said formula of an alkali metal meta-bisulfite.

8. An aqueous suspension suitable only for oral administration of a tetracycline antibiotic selected from the group consisting of amphoteric tetracycline, tetracycline hydrochloride and alkaline earth metal salts of tetracycline color-stabilized by the presence of from 0.001 to 0.5 percent by weight of said formula of an alkaline earth metal meta-bisulfite.

9. An aqueous suspension suitable only for oral administration of a tetracycline antibiotic selected from the group consisting of amphoteric tetracycline, tetracycline hydrochloride and alkaline earth metal salts of tetracycline color-stabilized by the presence of from 0.001 to 0.5 percent by weight of said formula of sodium meta-bisulfite.

10. An aqueous suspension suitable only for oral administration of a tetracycline antibiotic selected from the group consisting of amphoteric tetracycline, tetracycline hydrochloride and alkaline earth metal salts of tetracycline color-stabilized by the presence of from 0.001 to 0.5 percent by weight of said formula of calcium meta-bisulfite.

11. An aqueous suspension of tetracycline stabilized by 0.01 to 0.2% of an alkali metal bisulfite and having a pH between about 3.5 and 8.5.

12. An aqueous suspension of tetracycline stabilized by 0.01 to 0.02% of an alkali metal metabisulfite and having a pH between 3.5 and 8.5.

References Cited in the file of this patent

UNITED STATES PATENTS

| | | |
|---|---|---|
| 2,302,729 | Whelan | Nov. 24, 1942 |
| 2,699,054 | Conover | Jan. 11, 1955 |
| 2,716,651 | Waller et al. | Aug. 30, 1955 |
| 2,820,824 | Weidenheimer | Jan. 21, 1958 |

FOREIGN PATENTS

| | | |
|---|---|---|
| 503,158 | Belgium | May 31, 1951 |
| 7/1954 | Trinidad | Mar. 26, 1954 |

OTHER REFERENCES

Ratchford: "Ind. and Eng. Chem.," vol. 42 (1950), p. 1567.

Boothe et al.: "J. Am. Chem. Soc.," vol. 75, Sept. 20, 1953, p. 4621.

Conover et al.: "J. Am. Chem. Soc.," vol. 75, Sept. 20, 1953, pp. 4622–23.

Montmorency et al.: "Antibiotics and Chemotherapy," vol. IV, March 1954, pp. 313 to 318.